United States Patent
Schnell

(10) Patent No.: US 7,259,854 B2
(45) Date of Patent: Aug. 21, 2007

(54) CONTROL DEVICE FOR A CONVEYOR

(75) Inventor: Wolfgang Schnell, Hamburg (DE)

(73) Assignee: Phoenix Conveyor Belt Systems GmbH, Bad Blankenburg (DE)

( * ) Notice: Subject to any disclaimer, the term of this patent is extended or adjusted under 35 U.S.C. 154(b) by 97 days.

(21) Appl. No.: 10/559,033

(22) PCT Filed: Aug. 28, 2004

(86) PCT No.: PCT/DE2004/001899

§ 371 (c)(1),
(2), (4) Date: Nov. 30, 2005

(87) PCT Pub. No.: WO2005/023688

PCT Pub. Date: May 17, 2005

(65) Prior Publication Data

US 2006/0114452 A1    Jun. 1, 2006

(30) Foreign Application Priority Data

Sep. 3, 2003    (DE) ................................. 103 41 038

(51) Int. Cl.
*G01N 21/84*    (2006.01)
*B65G 43/00*    (2006.01)
*B65G 47/00*    (2006.01)

(52) U.S. Cl. .................................... 356/430; 198/502.1

(58) Field of Classification Search ..................... None
See application file for complete search history.

(56) References Cited

U.S. PATENT DOCUMENTS 6,291,991 B1    9/2001    Schnell (Continued)

FOREIGN PATENT DOCUMENTS

DE    44 44 264 C2    4/1996

(Continued)

OTHER PUBLICATIONS

International Search Report.

*Primary Examiner*—Michael P. Stafira
(74) *Attorney, Agent, or Firm*—Collard & Roe, P.C.

(57) ABSTRACT

The invention relates to a control device for a conveyor comprising an elastomeric conveyor belt which is provided with a carrying side for transporting material and a pulley side and comprises, in particular an embedded strength support, an optoelectronic system for optically detecting the belt surface, in particular the carrying side thereof in such a way that it is possible to identify a damage during functioning and to stop the conveyor in the case of a critical situation of the conveyor belt and timely repair it, a process control computer which is connected to said optoelectronic system and used for evaluating all data and interacts, in particular with a traction control, and different other elements of the conveyor, namely a non-driven drum, carrying rollers, a supporting structure and, if necessary other components. The inventive device is characterised in that the totality of the conveyor belt is divided into terminal sectors and each sector is provided with a distinct address in such a way that the sector marking is formed and the detection of each marking is carried out in a contactless manner by means of a first sensing unit, each of the sections is defined by an initial marking whose detection is also contactlessly carried out by means of a second sensing unit, the movable element of the conveyor is provided with an encoding unit and the first and second sensing units and the encoding unit are connected to the process control computer.

14 Claims, 2 Drawing Sheets

U.S. PATENT DOCUMENTS

| | | |
|---|---|---|
| 6,831,566 B1 | 12/2004 | Küsel |
| 6,988,610 B2 * | 1/2006 | Fromme et al. ......... 198/502.1 |
| 2003/0000808 A1 | 1/2003 | Küsel |

FOREIGN PATENT DOCUMENTS

| | | |
|---|---|---|
| DE | 100 17 473 A1 | 4/2000 |
| DE | 100 29 545 A1 | 2/2001 |
| DE | 101 00813 A1 | 8/2001 |
| DE | 101 29 091 A1 | 5/2002 |
| DE | 101 40 920 A1 | 5/2002 |
| DE | 203 12 806 U1 | 10/2003 |
| EP | 1 187 781 B1 | 3/2002 |
| EP | 1 222 126 B1 | 7/2002 |
| EP | 1 053 447 B1 | 9/2002 |
| WO | WO 03/049789 A | 7/2003 |
| WO | WO 03/059789 A * | 7/2003 |

* cited by examiner

CONTROL DEVICE FOR A CONVEYOR

CROSS REFERENCE TO RELATED APPLICATIONS

Applicant claims priority under 35 U.S.C. §119 of German Application No. 103 41 038.4 filed Sep. 3, 2003. Applicant also claims priority under 35 U.S.C. §365 of PCT/DE2004/001899 filed Aug. 28, 2004. The international application under PCT article 21(2) was not published in English.

BACKGROUND OF THE INVENTION

The invention relates to a device for monitoring a conveyor, comprising:
- a conveyor belt made of elastomer material, having a carrying side for the goods to be conveyed, and a running side, whereby the conveyor belt has, in particular, an embedded strength support (e.g. steel ropes, woven fabric);
- an optoelectronic system that optically detects the belt surface, particularly the carrying side, in that it recognizes damage during operation, and if a critical state of the conveyor belt is reached, shuts the system down, so that repair measures can be initiated in timely manner;
- a process computer with which the optoelectronic system is coupled, for the purpose of evaluating all of the data, whereby the processor is particularly connected with a drive control; as well as
- other system parts, namely a non-driven drum, support rollers, support scaffolding, as well as any other components that might be necessary.

Since conveyor belts are often the most important part in mine systems, and their failure can frequently result in a complete shut-down of production, methods for automatic, continuous monitoring of the conveyor belts are required. Aside from the known methods of slit monitoring (DE 44 44 264 C2) and connection monitoring (EP 1 053 447 B1), methods for monitoring the entire belt surface are also in demand, in order to recognize wear damage or surface impact damage or its further development during operation, and to shut the belt down if a critical state is reached, or to initiate repair measures in timely manner.

To achieve this goal, the use of optoelectronic systems, particularly in the form of electronic camera systems (line camera or surface camera), was proposed, and reference is made, in particular, to the following state of the art:

DE 100 29 545 A1
DE 101 00 813 A1
DE 101 29 091 A1
DE 101 40 920 A1
EP 1 187 781 B1
EP 1 222 126 B1

These optoelectronic systems generate images of the belt surface to be monitored. However, automatic assessment and evaluation of the image information obtained in this manner is very difficult, particularly if the change over time of discrete zones of the conveyor belt surface is supposed to be detected. It is true that methods have been described that can be used to identify certain structures of the belt surface, for example splices (connections), with a certain degree of probability. But in order to be able to carry out effective automatic monitoring of the belt as a whole, localization of any desired point of the belt with millimeter accuracy is required, since only in this way is it possible to follow up the development of damage over a certain period of time, using automatic image processing software.

SUMMARY OF THE INVENTION

The task of the invention now consists in making a device of this type available, in which it is possible to locate any desired point of the conveyor belts with millimeter accuracy, whereby the detectable accuracy is supposed to be better than ±1 mm.

This task is accomplished according to the characterizing feature of claim 1, in that
- the entire conveyor belt is divided into finite segments, whereby each segment is provided with a distinct address, so that segment marking occurs, whereby the detection of the address of the segment marking, in each instance, takes place without contact, by means of a first scanning unit;
- the segments are delimited by a start marking, in each instance, whereby the detection of the start marking, in each instance, also takes place without contact, by means of a second scanning unit;
- a movable part of the conveyor is provided with an encoder, and that
- the first and the second scanning unit as well as the encoder are coupled with the process computer.

Practical embodiments of the device according to the invention are indicated in claims 2 to 14.

BRIEF DESCRIPTION OF THE DRAWINGS.

The invention will now be explained using two exemplary embodiments, making reference to schematic drawings. These show.

Figure 1:
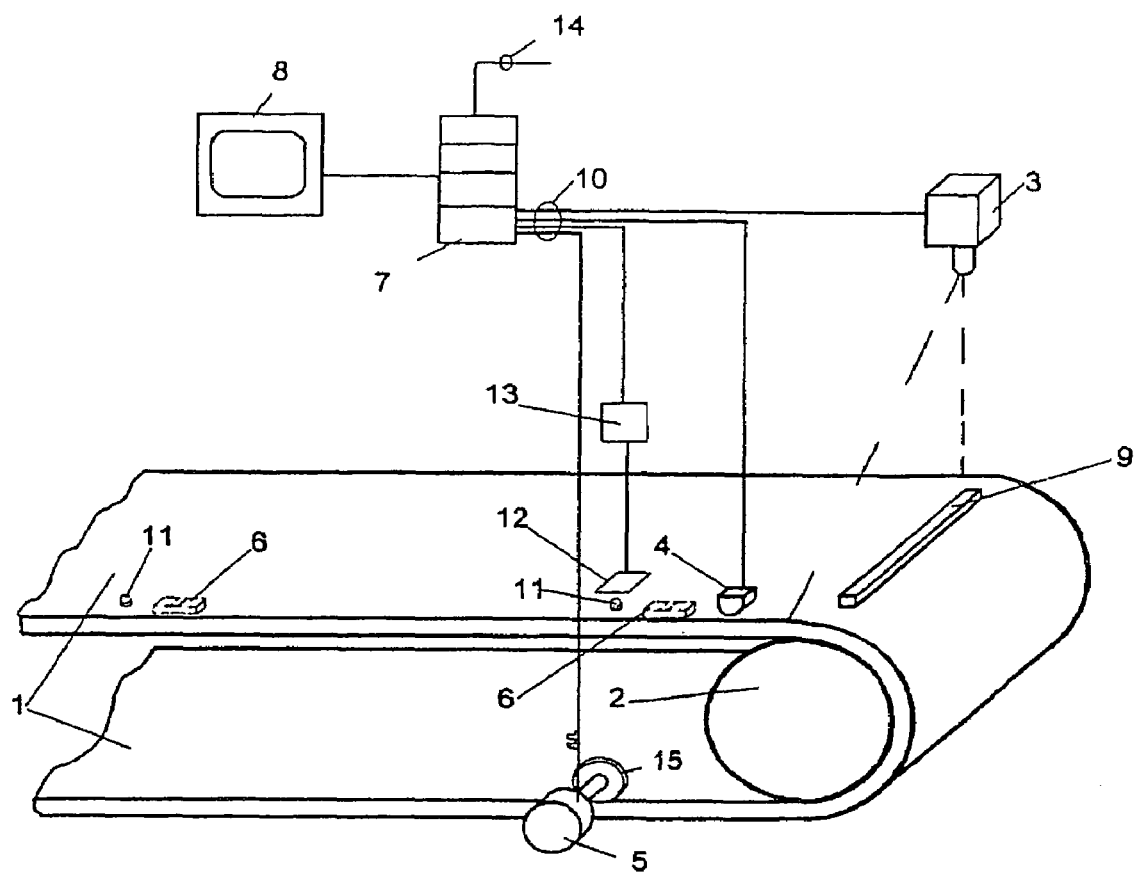
FIG. 1 a device having an encoder, which is driven by the conveyor belt itself, by means of a friction wheel coupling.

According to FIG. 1, the optoelectronic system 3 in the form of a line camera detects the entire width of the carrying side of the conveyor belt 1, specifically using a lighting device 9. With regard to details of such optoelectronic systems, reference is made to the state of the art cited initially.

Two start markings 6 comprise, i.e. delimit a finite segment X of the conveyor belt 1. The length of each segment is 10 m to 500 m, particularly under the aspect of equal lengths, in each instance.

With regard to the start marking 6, the following variants are used:
- The start marking is formed by at least one notch, color strip, reflection zone, metal particle, or permanent magnet.
- The start marking is a code, particularly under the aspect of mechanical, optical, magnetic, electrically conductive, or radioactive detection. The code, in turn, is a bar code or is structured similar to a bar code. Also, the code can consist of small permanent magnets, particularly in the form of a serial arrangement.

Detection of the start marking 6, in each instance, takes place by means of a scanning unit, particularly in the form of a reader head 4, without contact. In this connection, it is sufficient if a single scanning unit detects all of the start markings.

Every segment X is provided with a distinct address, so that a segment marking is formed. The distinctness is produced by means of segment numbering (e.g. 1, 2, 3, etc.).

Here, the address of the segment marking is a transponder 11. The scanning unit, which also performs the detection without contact, comprises an antenna 12 and a transponder reader 13. For the remainder, reference is made here to the general state of transponder technology.

The address of the segment marking can also detect those variants that were already mentioned in connection with the start markings, whereby then the scanning unit is also a read head, preferably within the framework of a common detection system of start marking and segment marking.

The address of the segment marking as well as the start marking are located within the carrying side of the conveyor belt 1, in its edge region. In this connection, it is advantageous if the transponder, in particular, is completely embedded in elastomer material. This also holds true when using a code, specifically in the form of a coded matrix (DE 100 17 473 A1).

Here, the address of the segment marking and the start marking 6 are separate marking systems, whereby the address of the segment marking is advantageously located in the vicinity of the start marking. In this connection, it is unimportant whether the address is situated in front of or behind the start marking, with reference to the running direction of the conveyor belt.

The precise location determination between the markings takes place using an encoder 5 that is driven by the conveyor belt 1 itself, for example by means of friction wheel coupling 15. The encoder produces a certain number of electrical pulses for a certain path distance. These pulses are acquired in the process computer 7 by means of a counter, and, together with the segment marking and the address of the belt segment, yield precise location data for every point of the conveyor belt to be monitored. The precision of the location determination depends on the selection of the encoder (number of pulses for a certain path distance) and the precision of the determination of the segment marking, and can be very high. Precision values of a few tenths of a millimeter can easily be achieved.

The location data obtained in this manner are linked with the image data of the optoelectronic system 3 by software, in a process computer 7, and thereby form the basis for automated image assessment, which can be used to detect any change in composition of every point of the belt surface. In this way, a significant data reduction becomes possible, since only those data that describe a significant change in the belt state have to be processed further.

In the case of monitoring of the conveyor belt 1 in ongoing conveyor operation, it is also possible to connect the process computer 7 with the drive control by means of an RDT line 14 (remote data transmission), and to shut the system down when serious defects are detected. Furthermore, it is possible to transmit the result of the belt inspection to any desired location anywhere in the world where the required receiving devices are present, using remote data transmission (e.g. the Internet).

Figure 2:
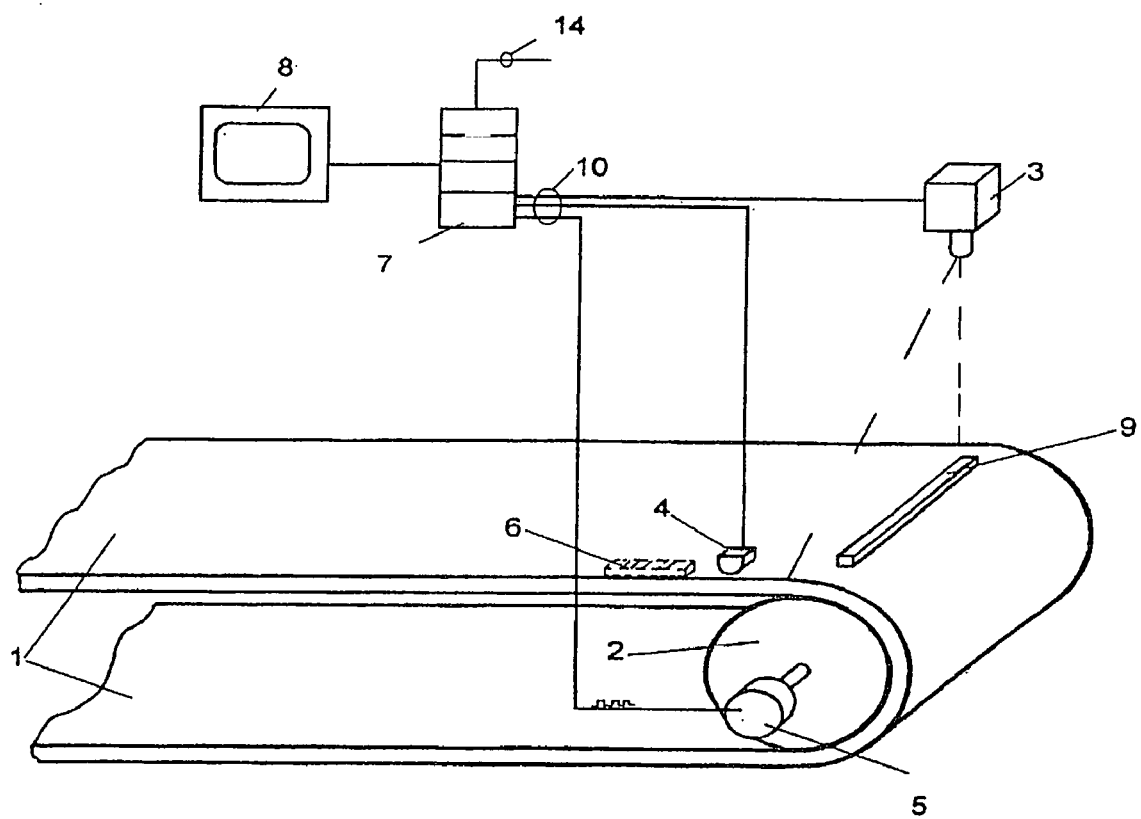
FIG. 2 a device having an encoder, which is driven directly, by way of the axle of a non-driven drum.

According to the exemplary embodiment according to FIG. 2, the address of the segment marking and the start marking 6 form a uniform marking system, for example in the form of a code in stripe form. The common scanning unit is a read head 4. Here, the encoder 5 is driven by way of the axle of a non-driven drum 2. With regard to further details of the device, reference is made to the exemplary embodiment according to FIG. 1.

The encoder can be, for example, a multi-pole encoder (DE 203 12 806 U1) or an optoelectronic encoder. In this regard, reference is made to the general state of encoder technology.

Although optoelectronic detection of the carrying side of the conveyor belt is shown in FIGS. 1 and 2, this concept can also be applied to observation of the running side (DE 101 00 813 A1).

REFERENCE SYMBOLS LIST 1 conveyor belt
2 non-driven drum (reversing or deflection drum)
3 optoelectronic system
4 read head for start marking and address, if applicable
5 encoder
6 start marking (trigger mark) and address of the segment marking, if applicable
7 process computer
8 monitor
9 lighting device
10 data collection
11 transponder
12 antenna
13 transponder reader
14 RDT line
15 friction wheel for encoder drive
X segment of the conveyor belt

What is claimed is:

1. Device for monitoring a conveyor, comprising:
   a conveyor belt (1) made of elastomer material, having a carrying side for the goods to be conveyed, and a running side, whereby the conveyor belt has, in particular, an embedded strength support (e.g. steel ropes, woven fabric);
   an optoelectronic system (3) that optically detects the belt surface, particularly the carrying side, in that it recognizes damage during operation, and if a critical state of the conveyor belt is reached, shuts the system down, so that repair measures can be initiated in timely manner;
   a process computer (7) with which the optoelectronic system (3) is coupled, for the purpose of evaluating all of the data, whereby the processor is particularly connected with a drive control; as well as
   other system parts, namely a non-driven drum (2), support rollers, support scaffolding, as well as any other components that might be necessary;
   wherein
   the entire conveyor belt (1) is divided into finite segments (X), whereby each segment is provided with a distinct address, so that segment marking occurs, whereby the detection of the address of the segment marking, in each instance, takes place without contact, by means of a first scanning unit;
   the segments (X) are delimited by a start marking (6), in each instance, whereby the detection of the start marking, in each instance, also takes place without contact, by means of a second scanning unit;
   a movable part of the conveyor is provided with an encoder (5), and
   the first and the second scanning unit as well as the encoder are coupled with the process computer.

2. Device according to claim 1, wherein the segments (X) are divided at a distance having a length of 10 m to 500 m.

3. Device according to claim 1, wherein the address of the segment marking as well as the start marking (6) are located within the belt surface, particularly within the carrying side, in its edge region.

4. Device according to claim 1, wherein the address of the segment marking and the start marking (6) are separate marking systems.

5. Device according to claim 4, wherein the address of the segment marking is situated in the vicinity of the start marking (6).

6. Device according to claim 1, wherein the address of the segment marking and the start marking (6) form a uniform marking system.

7. Device according to claim 1, wherein the address of the segment marking is a transponder, whereby the first scanning unit comprises an antenna (12) and a transponder reader (13).

8. Device according to claim 1, wherein the address of the segment marking and/or the start marking (6) is/are formed by at least one notch, color strip, reflection zone, metal particle, or permanent magnet.

9. Device according to claim 1, wherein the address of the segment marking and/or the start marking (6) is a code, particularly under the aspect of mechanical, optical, magnetic, electrically conductive, or radioactive detection.

10. Device according to claim 9, wherein the code is a bar code or is structured similar to a bar code.

11. Device according to claim 9, wherein the code consists of a small permanent magnet, particularly in the form of a serial arrangement.

12. Device according to claim 8, wherein the first and second scanning unit are a common detection system, particularly in the form of a read head (4).

13. Device according to claim 1, wherein the encoder (5) is driven by the conveyor belt (1) itself.

14. Device according to claim 1, wherein the encoder (5) is driven by way of the axle of a non-driven drum (2).

* * * * *